United States Patent
Brandwine et al.

(10) Patent No.: US 8,340,275 B1
(45) Date of Patent: Dec. 25, 2012

(54) SELECTIVE CONTACT BETWEEN CUSTOMERS AND CUSTOMER SERVICE AGENTS

(75) Inventors: Eric Jason Brandwine, Haymarket, VA (US); Andrew J. Doane, Vienna, VA (US)

(73) Assignee: Amazon Technologies, Inc., Reno, NV (US)

( * ) Notice: Subject to any disclaimer, the term of this patent is extended or adjusted under 35 U.S.C. 154(b) by 176 days.

(21) Appl. No.: 12/975,264

(22) Filed: Dec. 21, 2010

(51) Int. Cl.
*H04M 3/00* (2006.01)

(52) U.S. Cl. .................................. 379/265.09; 709/212

(58) Field of Classification Search ............. 379/265.09; 709/212
See application file for complete search history.

(56) References Cited

U.S. PATENT DOCUMENTS

| | | | |
|---|---|---|---|
| 2011/0051920 A1* | 3/2011 | Dashe et al. | 379/265.09 |
| 2011/0051922 A1* | 3/2011 | Jay et al. | 379/265.11 |
| 2012/0101865 A1* | 4/2012 | Zhakov | 705/7.13 |

* cited by examiner

*Primary Examiner* — Creighton Smith
(74) *Attorney, Agent, or Firm* — Knobbe Martens Olson & Bear, LLP (57) ABSTRACT

A network-based service may generate notifications regarding items of interest to a user. A contact selection service may receive the notifications and generate a user interface for transmission of the notification to the user. The generated user interface may include a unique identifier and may further enable the user to submit user contact information to request contact with a service agent. The contact selection service may further pre-authorize contacts between users and customer service agents CSA. The unique identifier, and optionally the submitted user contact information, may be employed by the contact selection service to selectively determine which customer contact requests received by the contact selection service are pre-authorized for contact with a CSA and enables such contacts between customers and CSAs to proceed.

31 Claims, 6 Drawing Sheets

SELECTIVE CONTACT BETWEEN CUSTOMERS AND CUSTOMER SERVICE AGENTS

BACKGROUND

In an increasingly networked society, users are increasingly employing network-accessible computing resources to perform a variety of tasks formerly performed using local and/or in-house computing resources. For example, a user may purchase computing power, software applications, data storage, and other computing services to meet his or her individual or business needs. As a result, providers of these network-based services face a number of contacts with their users to coordinate the setup, operation, and maintenance of these services, amongst other tasks. Systems such as call centers have been developed as a centralized, scalable mechanism to handle the received volume of user calls across a variety of contexts, including, for example, sales and marketing, technical support, and billing. However, call centers suffer from a variety of shortcomings.

For example, the availability of call center agents is typically based upon predetermined hours. Within these hours, a user that places a call to the call center may speak with a customer service agent. However, some users may over utilize call center resources, inhibiting or delaying other users from opportunities to speak with customer service agents. As a result, the quality of service provided by the call center may suffer, potentially frustrating users who wish to contact a call center agent.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Aspects of the present disclosure relate to contacts between users of a network-based service and service agents of the network-based service and, in particular, to selectively allowing contacts between the users and service agents. Contacts may include any communication between the users and service agents. Embodiments discussed below may refer to the users as customers and the service agents as customer service agents (CSAs). However, it may be understood that users are not limited to customers but may include any users of network-based services.

In this regard, a contact selection service is described that authorizes contacts between customers and CSAs prior to the contact taking place (pre-authorization). Subsequently, when a request for contact between a customer and a CSA is received by the contact selection service, the contact selection service may determine whether the contact has been pre-authorized. Should the contact selection service determine that the contact has been pre-authorized, customer contact with a CSA is allowed. However, if the contact selection service determines that the contact has not been pre-authorized, customer contact with the CSA may not be allowed.

In an embodiment, a customer using a customer computing device, such as a personal computer, may identify or purchase an item of interest presented by a network-based service. This network-based service may be anything that provides a good, service, or information that is of interest to the customer. Accordingly, the network-based service may include network-based computing providers such as those which sell computing resources for use by the customer (e.g., computing power, software applications, data storage, etc.), network-based retailers such as those which sell items for purchase to the customer, network-based sources of entertainment and/or information (e.g., network-based encyclopedias, media sharing, etc.), network-based social networking services which enable users to share content with one another, and the like.

Following the customer's identification or purchase of an item of interest, the network-based service may generate a notification regarding the item of interest or purchase that pertains to the customer. The notification may include any information determined by the network-based service to be pertinent to the item of interest. The notification may be provided to the contact selection service along with contact information for the customer. Customer contact information may include, but is not limited to, customer name, address (e.g., residence address, mailing address, business address, e-mail address), telephone number, and other information that may be employed to contact a customer known in the art. It may be understood that, while the notification is discussed in the context of a single customer, notifications may pertain to one or more customers.

In an example, a customer may purchase network-based data storage from a network-based service. The network-based service may periodically monitor the customer's storage usage in order to confirm that the underlying hardware and/or software controlling the network-based data storage is operating normally. The network-based storage may further assess whether the provided network-based data storage is meeting the customer's needs (e.g., sufficient capacity). In one aspect, the network-based service may generate notifications for the customer regarding scheduled or unscheduled interruptions of access to his or her network-based data storage. This notification may apprise the customer to schedule their data storage/retrieval in view of the interruption of service (in the case of a scheduled interruption) or that the network-based service is aware of a problem (in the case of an unscheduled interruption). In another aspect, the network-based service may generate a notification for the customer regarding his or her network-based data storage under the circumstance that his or her data storage has not been accessed for a selected duration of time. This notification may invite the customer to speak with a CSA regarding additional storage options, if his or her present data storage is not meeting his or her needs.

Upon receipt of the notification, the contact selection service may pre-authorize contact between the customer to which the notification pertains and CSAs of the network-based service. In an embodiment, pre-authorization may include determining a selected number of contacts that may be permitted between the customer and the CSAs. The number of pre-authorized contacts may be determined on the basis of criteria including, but not limited to, the nature of the notification. For example, notification issues that are relatively more severe or serious may be permitted a relatively larger number of pre-authorized contacts, while notification issues that are relatively less severe or serious may be permitted a relatively smaller number of pre-authorized contacts. In alternative embodiments, pre-authorization may include a selected duration of time over which a customer may contact a CSA. For example, a pre-authorized customer may contact a customer over a selected date range.

The contact selection service may further generate a user interface for transmission of the notification to the customer. In one embodiment, the user interface may include an electronic mail (e-mail) message. In alternative embodiments, the user interface may include, but is not limited to, telephone calls, voice-over IP (VoIP) calls, video conferencing, instant messages (IM), short message service (SMS) messages, text messages, and other communications protocols known in the art.

The generated user interface may further enable the customer to submit a contact request to the contact selection service for contact with a CSA and may be referred to herein as a contact user interface. In one embodiment, the generated contact user interface may include a form or other input mechanism by which the customer may provide his or her customer contact information. In an alternative embodiment, the generated contact user interface may include a link (e.g., a hyperlink) to a network-based resource (e.g., a web page) that includes a form or other input mechanism by which the customer may provide his or her customer contact information. The customer contact information may include information regarding any manner of communication available with the customer.

For example, continuing the example above, assume that the customer receives an e-mail message that includes a notification regarding data storage he or she has purchased from the network-based service. The notification may indicate that the customer's data storage has not been accessed in over three months and that the customer may wish to contact a customer service agent to discuss his or her data storage options if his or her data storage needs have changed. The e-mail message may further include a form that allows the customer to submit his or her telephone number to the contact selection service for contact by a customer service agent.

In one embodiment, when the customer submits a contact request to the contact request service, the contact request may include any information provided by the customer, as well as any transmission information employed to transmit the contact request to the contact selection service. Information provided by the customer in the contact user interface may include customer contact information, as discussed above. Examples of transmission information may include an email address from which the contact request originated, an internet protocol (IP) address of a computing device from which the contact request originated, and the like.

Whether the customer is contacted by a CSA may be based upon a determination of whether the customer contact has been pre-authorized. As discussed in greater detail below, pre-authorization may be determined by the customer contact from analysis of a unique identifier (unique ID) within a received contact request. The unique ID may be an identifier generated by the contact selection service after receipt of the notification from the network-based service. When the contact user interface is employed to submit contact information to the contact selection service, the unique ID may also be included within the contact request. The unique ID may be examined by the contact selection service and, based upon the examination contact between a CSA and a customer may be permitted or denied.

In one embodiment, the unique ID may be a data structure configured for use in lookup operations (e.g., a key) to permit or deny contact between a CSA and a customer. Lookup operations may include comparing the unique ID against one or more other unique IDs maintained in a data store and identifying one or more other pieces of information correlated with the unique ID. In another embodiment, the unique ID may be a self-contained data structure (e.g., a token) configured for use in permitting or denying contact between a CSA and a customer.

In an embodiment, the contact selection service may maintain information regarding customers and pre-authorization information for respective customers, such as a number of pre-authorizations remaining for a customer and/or a pre-authorized contact time duration remaining for a customer. By comparing the unique ID received within the contact request, optionally in combination with one or more of the customer information received in the contact request, against the customer information maintained by the customer selection service, contact requests may be determined as valid (originating from a known customer) or invalid (not originating from a known customer). As discussed in greater detail below, once a customer is verified from their contact request, whether the customer is pre-authorized for contact with a CSA may also be determined. A customer that submits a valid and pre-authorized contact request may be permitted to contact a CSA.

In one embodiment, the unique ID alone may used by the contact selection service for contact request verification. For example, the unique ID returned within the contact request may be compared against one or more unique IDs maintained in a data store in communication with the contact selection service (e.g., known unique IDs). Should the contact selection service determine that the unique ID of the contact request matches one of the known unique IDs, the contact request may be considered valid by the contact selection service and the contact selection service may further examine the contact request for authorization of the contact, as discussed below. Conversely, should the unique ID not match a known unique ID, the contact selection service may determine that the contact request is not valid and the contact selection service may deny the contact request.

For example, continuing the example above, the customer who received the notification e-mail may submit a response to this email from his or her e-mail account with their telephone number. The response constitutes a contact request and may include the unique ID that was present in the originally received notification e-mail. The contact selection service may identify the unique ID from the contact request and compare this submitted unique ID with one or more known unique IDs. As the customer is responding to an e-mail received from the contact selection service, the unique ID within the e-mail is a known unique ID and the contact selection service may determine that the contact request is valid.

In another embodiment, the unique ID may be employed by the contact selection service in conjunction with other customer identification information for contact request verification. For example, as in the example above, the customer who received the notification e-mail may submit a response to this e-mail from his or her email account with their telephone number. The contact selection service may receive the contact request and identify the unique ID, phone number, and e-mail address submitted by the customer in the contact request. The contact selection service may employ the returned unique ID to identify one or more of a customer name, phone number, and e-mail address maintained by the contact selection service. One or more of the returned phone number and e-mail address may be compared against the name, phone number, and e-mail address maintained by the contact selection service. In one embodiment, the contact selection service may validate the contact request if all three of the customer information matches the customer information maintained by the contact selection service.

In an alternative embodiment, the contact selection service may validate the contact request if two of the three (e.g., a majority) of the customer information provided in the contact request match the customer information maintained by the contact selection service. These relaxed criteria may reflect an understanding that customer information, such as a telephone number or e-mail address, are not static but may change over time. Provided that the deviations between the customer information provided in the contact request and the customer information maintained by the contact selection service are small, the contact selection service may still consider a contact request valid.

In a further example, the history of a unique ID, as it is employed in conjunction with other customer identification information, may be considered by the contact selection service for determination contact request verification. For example, as in the example above, the customer who received the notification e-mail may submit a first response in which the submitted customer information matches the unique ID, phone number, and e-mail address maintained by the contact selection service. In response, the contact selection service may validate the contact.

Subsequently, the contact selection service may receive a second contact request with the same unique ID but different phone number and e-mail address. Despite the large deviation between the second submitted customer information and the customer information maintained by the contact selection service (one of three matches), the contact selection service may validate the customer contact based upon the earlier validated contact.

A third contact request may be received by the contact selection service with the same customer contact information as the first contact request. The difference between the first/third customer information and the second customer information indicates that the customer's contact user interface may have been compromised by a third party. In response, the contact selection service may not validate this third contact request.

In alternative embodiments, the verification operations discussed above may be performed using unique IDs including tokens. As discussed above, tokens may be self-contained data structures that include at least a portion of any information known to the contact selection service at the time the token is generated. Such information may include customer information and any information regarding customer pre-authorization. In this manner, lookup operations using the unique ID may not be necessary but rather information contained within the unique ID may be employed by itself to perform verification operations.

For example, in one embodiment, the unique ID may include an XML file including customer information that is digitally signed and encrypted as is known in the art. Upon receipt of a contact request including the unique ID, the contact selection service may open the unique ID to read its contents, such as customer information known to the contact service at the time the unique ID was generated. One or more of such customer information may be compared against customer information included within the contact request (e.g., customer name, telephone number, IP address, etc) to verify the contact request. If a match between one or more of the customer information is identified, as discussed above, the contact request may be verified. However, if a match between one or more of the customer information is not identified, the contact request may be found invalid.

Having verified the contact request, the contact selection service may further determine whether the customer retains any pre-authorized contacts. In one embodiment, the unique ID may also be employed to access the pre-authorization status of the customer. For example, in embodiments where the unique ID includes a lookup key, the contact selection service may employ the unique ID to lookup the customer pre-authorization status of the customer from a data storage device. Each time the number of customer pre-authorization status changes (e.g., the number of remaining contacts that the customer is allowed, a time duration during which the customer is authorized to contact a CSA), this status may be updated in the data storage device. In embodiments where the unique ID includes a self-contained token, the unique ID may store the customer's pre-authorization status within the unique ID itself. As discussed in greater detail below, each time the customer pre-authorization status is changed, the token may be updated by sending a new contact user interface to the customer including the new token.

For example, the contact selection service may determine the customer pre-authorization status using the unique ID by lookup or consulting the unique ID directly, as discussed above. If the customer retains at least one pre-authorized contact, the contact selection service may permit the customer contact with a CSA. If the customer does not retain at least one pre-authorized contact, the contact selection service may deny the customer contact with a CSA. In an alternative embodiment, if the customer does not retain at least one pre-authorized contact, the contact selection service may permit the customer to purchase additional contacts with a CSA.

Subsequently, the contact selection service may provide a mechanism by which the customer may contact a CSA. Contacts may be conducted by communication mechanisms including, but not limited to, telephone calls, voice-over IP (VoIP) calls, video conferencing, instant messaging (IM), short message service (SMS), text messaging, electronic mail (e-mail), and other communications protocols known in the art. As described in greater detail below, when the customer employs such a contact mechanism to contact a CSA, the contact selection service may distribute the contact to an available CSA.

Beneficially, by transmitting a contact user interface to customers that enables the submission of customer contact information, a mechanism for customer support is provided that is controlled by the contact selection service. As a result, potential abuse of customer support services may be mitigated and customer support can be offered to customers irrespective of whether the customers subscribe for customer support services or not.

Figure 1:
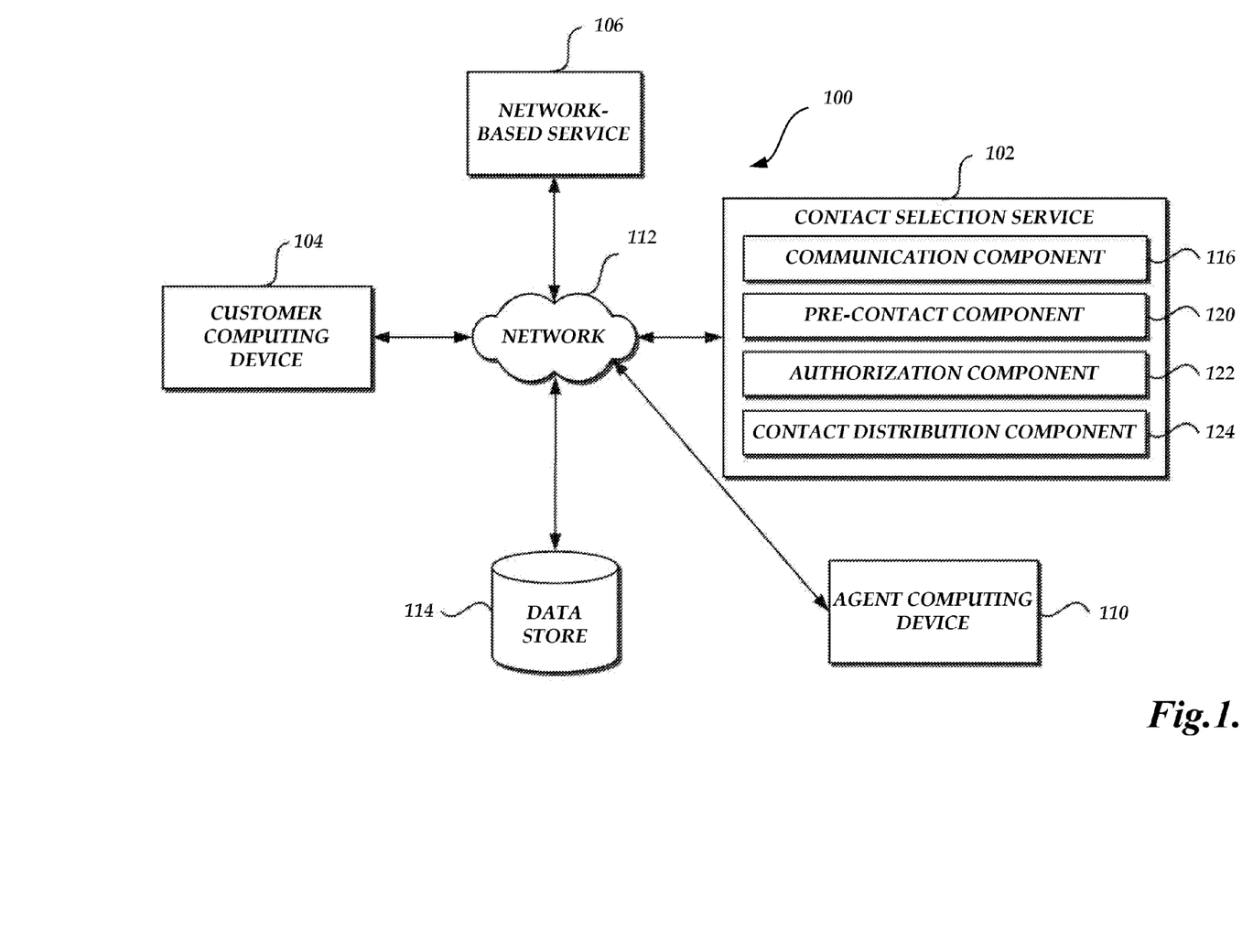
FIG. 1 is a schematic block diagram of an illustrative contact selection service for selectively permitting contacts to take place between customers and customer service agents.

With reference to FIG. 1, an embodiment of an operating environment 100 for selectively permitting contacts between customers to customer service agents (CSAs) is illustrated. In the operating environment 100, a customer may employ his or her customer computing device 104 to communicate with a network-based service 106 implemented via a website. This network-based service 106 may be anything that provides a good, service, or information that is of interest to the customer. Accordingly, the network-based service 106 may include network-based computing providers such as those which sell computing resources for use by the customer (e.g., computing power, software applications, data storage, etc.), network-based retailers such as those which sell items for purchase to the customer, network-based sources of entertainment and/or information (e.g., network-based encyclopedias, media sharing, etc.), network-based social networking services which enable users to share content with one another, and the like.

The network-based service 106 may maintain or generate one or more contact user interfaces capable of display by the customer computing device 104. Should the network-based service 106 identify information regarding the provided contact user interfaces (e.g., information regarding what is displayed in the contact user interfaces, information regarding the transmission of the contact user interfaces, etc.), the network-based service 106 may transmit a notification to a contact selection service 102. As discussed in greater detail below, the contact selection service 102 may transmit the notification to the customer and selectively permit contact with CSAs in response to requests for contact with CSAs.

The operating environment 100 is depicted in FIG. 1 as operating in a distributed computer environment comprising several computer systems that are interconnected using one or more computer networks. The operating environment 100 could also operate within a computer system having a fewer or greater number of components than are illustrated in FIG. 1. Thus, the depiction of operating environment 100 in FIG. 1 should be taken as illustrative and not limiting to the present disclosure. For example, the operating environment 100 could implement various Web services components (including but not limited to virtual utility computing services, a.k.a. "cloud computing services") and peer-to-peer network configurations to implement at least a portion of the processes.

The contact selection service 102 and network-based service 106 may each be embodied in a plurality of components, each executing an instance of the respective contact review service 102 and network-based service 106. A server or other computing component implementing the contact selection service 102 and network-based service 106 may include a network interface, memory, processing unit, and computer readable medium drive, all of which may communicate which each other may way of a communication bus. The network interface may provide connectivity over a network 112 and/or other networks or computer systems. The processing unit may communicate to and from memory containing program instructions that the processing unit executes in order to operate the contact selection service 102 and network-based service 106. The memory generally includes RAM, ROM, and/or other persistent and auxiliary memory.

Those skilled in the art will appreciate that the network 112 may be any wired network, wireless network, or combination thereof. In addition, the network 112 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and, thus, need not be described in more detail herein.

The customer computing device 104 and agent computing device 110 may include any communication device, such as a PC, a kiosk, a thin client, a home computer, and a dedicated or embedded machine. Further examples may include laptop or tablet computers, personal computers, personal digital assistants (PDAs), hybrid PDAs/mobile phones, mobile phones, electronic book readers, set-top boxes, and the like.

With further reference to FIG. 1, illustrative components of the contact selection service 102 will now be addressed. In an embodiment, the contact selection service 102 may include a communication component 116 for receiving the notifications from the network-based service 106 and for transmitting the notifications to the customer. Notifications may include any information that the network-based service 106 deems determines to be pertinent to the customer, as well as customer contact information regarding one or more customers to which the notifications pertain. In an example, network-based services including network-based computing providers may provide notifications regarding hardware and/or software problems, configuration settings, security issues, and the like. In another example, network-based services including network-based retailers may provide notifications regarding promotions, recalls, pre-orders, and the like. In a further example, network-based social networking services may provide notifications regarding account features and other account settings. Further examples of notifications regard billing, sales, and marketing. It may be understood that the above examples are not exhaustive and that other notifications may be employed without limit.

In one embodiment, the communication component 116 may generate contact user interfaces for transmitting the notifications to their respective customers. The contact user interfaces may include, but are not limited to, electronic mail (e-mail) messages, telephone calls, voice-over IP (VoIP) calls, video conferencing, instant messages (IM), short message service (SMS) messages, text messages, other communications protocols known in the art, and combinations thereof.

The contact user interfaces generated by the communication component 116 may be further configured to enable the customer to enter customer contact information and/or direct the customer to network-based resource that enables the customer to enter contact information. As discussed in greater detail below, should the customer provide his or her customer contact information, the customer contact information may be returned to the customer selection service 102 as a contact request for possible contact with a CSA. Examples of such contacts may be found in U.S. patent application Ser. No. 12/547,370, filed on Aug. 25, 2009, entitled, "SYSTEMS AND METHODS FOR CUSTOMER CONTACT" and U.S. patent application Ser. No. 12/547,387, filed on Aug. 25, 2009, entitled, "SYSTEMS AND METHODS FOR CUSTOMER CONTACT," the entirety of each of which is hereby incorporated by reference in their entirety.

In one embodiment, the contact user interfaces may include blanks, forms, or other mechanisms for entry of customer contact information. In alternative embodiments, the contact user interfaces may include a link to a network-based resource (e.g., a hyperlink to a webpage) that includes blanks, forms, or other mechanisms for entry of customer contact information. The specific customer contact information requested by the contact user interface may vary, depending upon the manner in which contact between the customer and CSA is performed. For example, contacts between a customer and a CSA may be conducted by communication mechanisms including, but not limited to, telephone calls, voice-over IP (VoIP) calls, video conferencing, instant messaging (IM), short message service (SMS) text messaging, electronic mail (e-mail), and other communications protocols known in the art. In the case of contact that is a telephone call, the contact user interface may include a form that requests at least a customer's telephone number, while in the case of a contact that is an instant message, the form may request at least a customer's instant message address. It may be understood that the contact user interface may request additional information, such as a customer name, password, or other identifying information as is known in the art.

The contact selection service 102 may further include a pre-contact component 120. In response to receipt of the notification, the pre-contact component 120 may determine pre-authorized contacts that are allocated to customers. Such pre-authorized contacts may include, but are not limited to, a number of pre-authorized contacts and a time duration over which contact is pre-authorized. The pre-authorized contacts allocated to a customer by the pre-contact component 120 may be determined in a variety of ways. In one embodiment, the notification may provide instructions to the pre-contact component 120 specifying the pre-authorized contact allocated to a customer (e.g., 3 contacts, a date window, etc.).

In another embodiment, the pre-contact component 120 may employ programmed logic to determine the allocation of pre-authorized contacts that are allocated to a customer. For example, the notification may include a status level (e.g., low, medium, high, severe) and the pre-contact component 120 may employ standing instructions or rules of the network-based service 106 to determine the pre-authorized contacts that are associated with each status level (e.g., low=1 contact or 1 week of CSA contact starting at a selected date, medium=2 contacts or 2 weeks of CSA contact starting at a selected date, etc.).

In further embodiments, the notification may include a reference number that may be used by the pre-contact component 120 to retrieve a pre-authorized contact allocation stored in one or more data stores, represented by data store 114. It may be understood that data store 114 may include network-based storage capable of communicating with any component of the operating environment 100 via network 112. The data store 114 may further include storage that is in local communication with any component of the operating environment 100.

The pre-contact component 120 may further generate a unique ID that may be included within the contact user interface transmitted with the client. The unique ID may be further configured such that when the contact user interface is copied or employed to submit contact information in a contact request, the unique ID may also be included in the copied contact user interface or contact request. As discussed in greater detail below, the unique ID may be used by an authorization component 122 of the contact selection service 102 to verify contact requests and authorize contact requests received by the contact selection service 102.

In one embodiment, the unique ID may include identifiers that may be employed in lookup operations. Examples of such lookup identifiers may include, but are not limited to, keys such as universally unique identifiers (UUIDs). In other embodiments, the unique ID may include identifiers that are self-contained and may be employed to store customer information, such as tokens. The unique ID generated by the pre-contact component 120 may be transmitted with the contact user interface to the client.

In one aspect, there is no guarantee that a contact user interface that was originally sent to a given customer has remained secure. For example, in one aspect, the contact user interface may be tampered (e.g., the unique ID may be modified) in an attempt to obtain additional pre-authorized customer contacts. In another aspect, it is possible that a contact user interface may be copied and used by other individuals to submit contact requests to the contact selection service 102.

Therefore, the authorization component 122 may employ the unique ID, alone or in combination with other customer contact information, to determine whether a received contact request is valid.

In one embodiment, the authorization component 122 may employ the unique ID contained within the contact request to verify a received contact request. For example, the unique ID included within a received contact request may be compared with one or more unique IDs known to the contact selection service 102 in a lookup operation. In an embodiment, the data store 114 may maintain a data structure of known unique IDs. Known unique IDs may include those unique IDs generated by the communication component 116. Should the unique ID of the contact request be included within the known unique IDs of the data store 114, the authorization component 122 may determine that the received contact request is verified. However, should the unique ID of the contact request not be included within the known unique IDs of the data store 114, the authorization component 122 may determine that the received contact request is not verified.

In another embodiment, the authorization component 122 may compare the unique ID contained within the contact request with unique IDs known to be blacklisted. In an embodiment, the data store 114 may maintain a data structure of unique IDs that are blacklisted. Should the unique ID of the contact request be contained within the blacklisted unique IDs of the data store 114, the authorization component 122 may determine that the contact request not verified. Alternatively, should the unique ID of the contact request not be contained within the blacklisted unique IDs of the data store 114, the authorization component 122 may determine that the contact request is verified.

In a further embodiment, the authorization component 122 may employ the unique ID contained within the contact request in combination with one or more customer information included within the received contact request in order to validate a contact request. Examples of the received customer information may include, but is not limited to, customer contact information submitted by the customer and transmission information. Customer contact information may include, but is not limited to, the customer's name, address (e.g., residence address, mailing address, business address, e-mail address), telephone number, and other information that may be employed to contact a customer known in the art. Transmission information may include information pertaining to the transmission of the contact request. Examples of transmission information may include, but are not limited to, an e-mail address from which the contact request originated, an internet protocol (IP) address of a computing device from which the contact request originated, and the like.

In order to employ the received unique ID in combination with one or more customer information to validate a contact request, the authorization component 122 may compare the received unique ID and/or one or more customer information with known unique ID and/or customer information. For example, the authorization component 122 may identify the unique ID and one or more customer information present within the contact request. The authorization component 122 may further submit this information to the data store 114 to determine if matching information is found within the data store 114. In one embodiment, the authorization component 122 may determine that the contact request is valid if each of the received unique ID and customer information matches the known information within the data store 114. In alternative embodiments, the authorization component 122 may determine that the contact request is valid if a selected number of the received unique ID and customer information match the known information within the data store 114. For example, in certain embodiments, the selected number of received unique ID and customer information matching the known information within the data store 114 may be a majority of the received unique ID and customer information. Contact requests that are not determined to be valid may be returned to the customer indicating that the contact request is denied. In certain embodiments, if the received unique ID does not match the known unique ID, a contact request may be determined by the authorization component 122 to be invalid, irrespective of the number of received customer information that match known customer information.

In a further embodiment, the authorization component 122 may consider the history of a received unique ID in addition to comparing the received unique ID and the one or more customer information with known unique ID and customer information. As described above, a contact request may be considered valid if a selected number of the received unique ID and customer information match known unique ID and customer information. However, should the unique ID and/or customer information change during successive contact requests, the authorization component 122 may optionally deny a contact request, even if selected contact requests include received unique ID and customer information that match known unique ID and customer information. A contact request denial of this type may reflect that a customer's contact user interface may be compromised. For example, the contact user interface may be concurrently employed by another user who is submitting different customer information than the customer when making contact requests. As this behavior is undesirable, it may prompt denial of contact requests.

In alternative embodiments, unique IDs including self-contained tokens may be employed as discussed above without lookup operations. For example, the authorization component 122 may compare one or more received customer information against one or more customer information included within the unique ID. The authorization component 122 may determine that a contact request is valid if a selected number of the received customer information matches the customer information within the unique ID. For example, in certain embodiments, the selected number of received customer information matching the customer information within the unique ID may be a majority of the customer information. Contact requests that are not determined to be valid may be returned to the customer indicating that the contact request is denied.

Verified contact requests may be further subjected to authorization by the authentication component 122. The unique ID may also be employed by the authentication component 122 to determine the pre-authorization status of the customer submitting the contact request. As discussed above, the unique ID may be associated with the pre-authorization contacts allocated to the customer. In the case where the unique ID is a key, the authentication component 122 may determine the pre-authorization contacts allocated to the customer by employing the unique ID in a lookup operation. The data store 114 may store one or more data structures that maintain associations between the unique ID and the number of pre-authorized contacts allocated to the respective customers. The authentication component 122 may submit the unique ID to the data store 114 and, in response, the data store 114 may return the number of pre-authorized contacts allocated to the authentication component 122. In the case where the unique ID is a token, the allocated pre-authorized contacts may be stored by the unique ID itself. The authentication component 122 may therefore retrieve the number of pre-authorized contacts by examining the structure of the unique ID. Alternatively, the unique ID may also be employed in a lookup operation to identify the allocated pre-authorized contacts.

Provided that the pre-authorized contacts allocated to the customer indicate that contact between the customer and a CSA is authorized (e.g., a number of pre-authorized contacts is greater than zero, a current time is within an pre-authorization time window, etc.), the authentication component 122 may forward a validated contact request to a contact distribution component 124 of the contact selection service 102. The contact distribution component 124 is configured to place the customer in contact with an available CSA (e.g., route the customer call to an available agent phone). For example, the contact distribution component 124 may be in communication with one or more CSAs, as represented by agent computing device 110. Embodiments of the contact distribution component 124 may be found in U.S. patent application Ser. No. 12/192,067, filed on Aug. 14, 2008, entitled, "SYSTEM AND METHOD FOR AUTOMATED CALL DISTRIBUTION" and U.S. patent application Ser. No. 12/192,064, filed Aug. 14, 2008, entitled, "INDEPENDENT CUSTOMER SERVICE AGENTS," the entirety of each of which are hereby incorporated by reference.

During or after completion of the contact between the customer and the CSA, the pre-authorized contacts allocated to the customer may be updated. In embodiments where a customer is allocated a selected number of contacts with a CSA, the pre-contact component 120 may automatically deduct one pre-authorized contact from a customer's total number of pre-authorized contacts when the customer is placed into contact with a CSA. In an alternative embodiment, a CSA may change the customer's allocation of pre-authorized contacts based upon the substance of the contact. For example, if the CSA determines that the customer's issue is more severe than the average recipient of the notification, the CSA may increase the customer's number of pre-authorized contacts or change a time window over which a customer is authorized to contact a CSA. Alternatively, if the CSA determines that the customer's issue is less severe than the average recipient of the notification, the CSA may decrease the customer's number of pre-authorized contacts or time window over which a customer is authorized to contact a CSA. In another example, if the CSA determines that the customer's purpose for the contact does not warrant using one of the customer's pre-authorized contacts the CSA may instruct that the customer's pre-authorized contacts are not debited for the contact.

Once the customer's revised pre-authorized contact allocation is determined, the unique ID may be updated to reflect the revision. In embodiments where the unique ID is a key, the unique ID itself may not change. However, when the unique ID is employed to retrieve the customer's allocation of pre-authorized contacts, the revised allocation of pre-authorized contacts may be retrieved. In embodiments where the unique ID is a token, the customer may be sent a new contact user interface including a new unique ID that has been updated to reflect the revised allocation of pre-authorized contacts.

Figure 2:
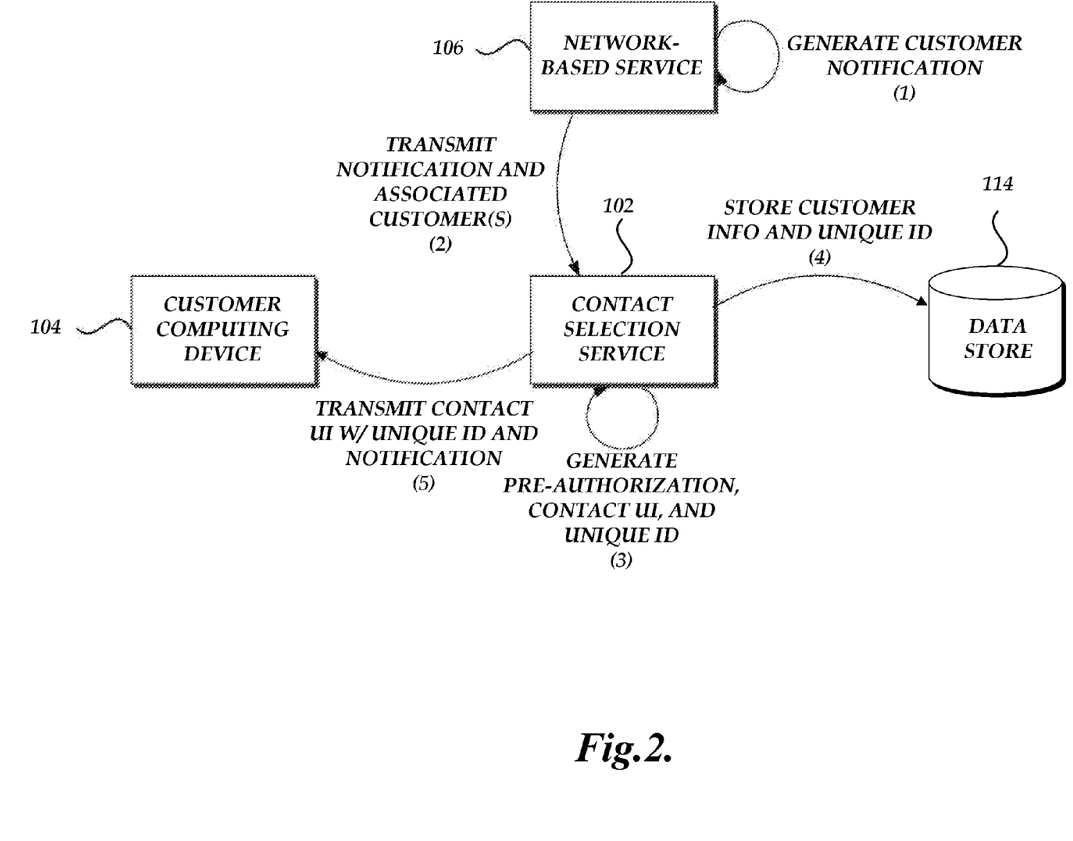
FIG. 2 is a block diagram of the operating environment of FIG. 1, illustrating the contact selection service providing a contact user interface that includes a unique identifier and a notification to a customer computing device.

FIG. 2 is a block diagram of the operating environment of FIG. 1, illustrating transmission of a contact user interface to a customer employing his or her customer computing device 104. As depicted in FIG. 2, the network-based service 106 may generate a notification pertaining to one or more customers of the network-based service 106. The notification may be transmitted to the contact selection service 102 along with contact information for the one or more customers impacted by the notification.

In response to receipt of the notification, the contact selection service 102 may determine a pre-authorization including an allocation of pre-authorization contacts for the respective customers, such as a number of pre-authorized contacts and/or a time duration during which a customer may contact a CSA. As discussed above, the allocation of pre-authorization contacts allocated to respective customers may be determined based upon different factors, including, but not limited to, instructions included in the notification, standing instructions or rules of the network-based service 106 based upon indicators within the notification, lookup tables based upon indicators within the notification, and the like.

The contact selection service 102 may further generate the unique ID and contact user interface. The contact user interface may be transmitted to the customer employing his or her customer computing device 104 and may include the unique ID. The contact user interface may further be employed by the customer computing device 104 to display the notification. The customer information received from the network-based service 106, the generated pre-authorization contacts for respective customers, and the generated unique ID may be associated with each other and stored in data store 114 prior to and/or concurrently with transmission of the contact user interface to the customer computing device 104.

Figure 3:
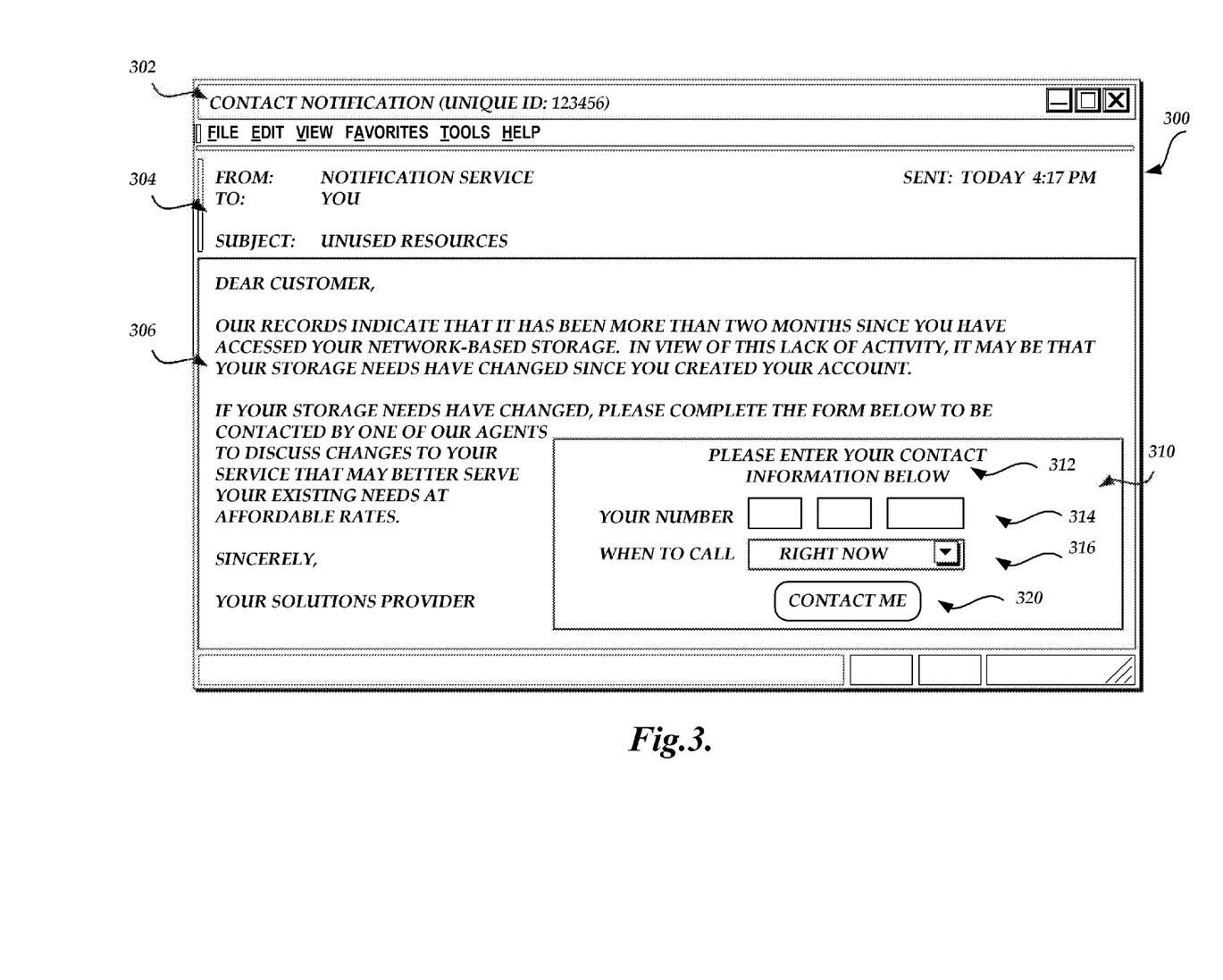
FIG. 3 is an illustrative contact user interface for display on the customer computing device that includes the notification and the contact user interface.

FIG. 3 is an illustrative contact user interface 300 for display on the customer computing device 104. The contact user interface 300 may include unique ID 302, address window 304, notification window 306, and customer contact information window 310. Unique ID 302 is illustrated in contact user interface 300 as an alpha numeric string for clarity. It may be understood, however, that the unique ID 302 may be hidden from the customer or other user of the contact user interface. For example, in certain embodiments, the unique ID 302 may not be visible within the contact user interface 300 itself and/or the unique ID 302 may be encrypted.

Certain embodiments of the contact user interface 300 may include address window 304. The address window 304 may include a "to:" field that indicates the recipient of the contact user interface (e.g., the customer) and a "from:" field that indicates the sender of the contact user interface 300 (e.g., the network-based service 106, the contact selection service 102, etc.). The address window 304 may further include a "subject" field that describes the sender's purpose for transmitting the contact user interface 300

The notification may be included within the notification window 306. The notification window 306 may include text, audio, video, and other audio and visual forms of communication that convey the purpose for which the notification has been sent. In a non-limiting example, the notification illustrated in notification window 306 indicates that the customer has not accessed his or her network-based storage in over two months and invites the customer to contact a CSA to discuss possible storage options if his or her storage needs have changed.

The customer contact information window 310 may enable the customer to enter contact information so that a contact request may be transmitted to the contact selection service 102. The customer contact information window 310 includes instructions 312 that advise the customer to enter contact information. The customer contact information window 310 further includes a form 314 which allows the customer to enter his or her telephone number. The customer contact information window 310 additionally includes a user interface object 316, such a selection box that allows the customer to select a time at which the customer would like to receive a return contact (e.g., a call back) from a customer service agent. Options from which the customer may select in user interface object 316 may include, but are not limited to, "right now," an absolute time such as "1:00 pm," a relative time such as "two hours from now," and the like. Once the customer has made their selections, the customer may submit his or her contact request by selecting user interface object 320. In alternative embodiments, the customer contact information window 310 need not be present in the contact user interface 300. Instead, the contact user interface 300 may include a link to a network-based resource, such as a hyperlink to a webpage, where the customer contact information window 310 may be present.

Figure 4A:
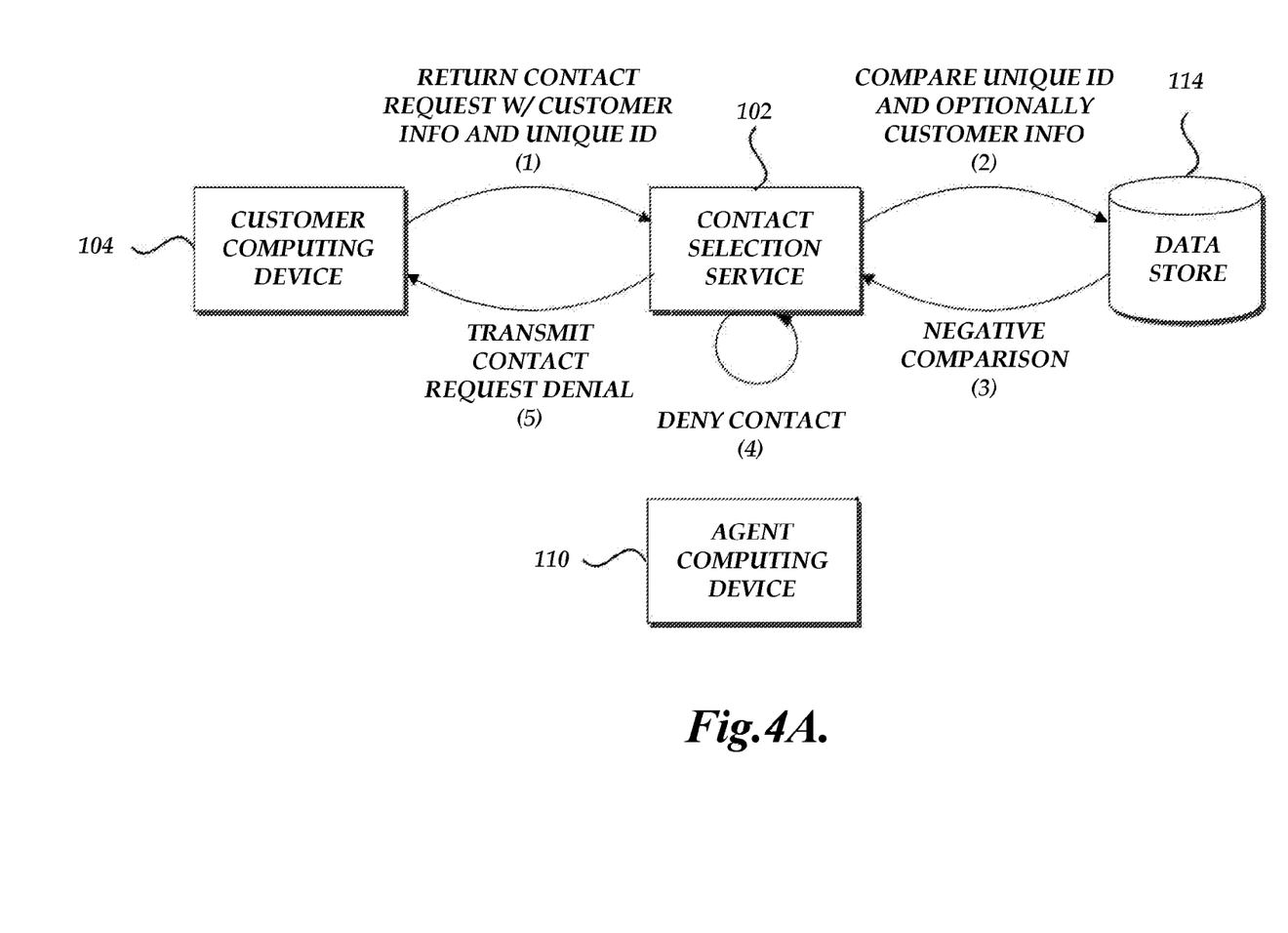
FIG. 4A is a block diagram of the operating environment of FIG. 1, illustrating the contact selection service denying the customer contact with a customer service agent.

Referring to FIG. 4A, the customer computing device 104 may return the contact request including the unique ID and customer information to the contact selection service 102. In one embodiment, the contact selection service 102 may compare at least the returned unique ID to known unique IDs maintained within the data store 114. In further embodiments, the contact selection service 102 may compare the returned unique ID and one or more of the returned customer information to known unique ID and customer information maintained within the data store 114.

In one embodiment, a negative comparison may be returned by the data store 114 if no match is found to the returned unique ID within the known unique IDs maintained within the data store 114. In another embodiment, a negative comparison may be returned by the data store 114 if a match is found to the returned unique ID within the known unique IDs but less than a selected number of matches are found to the returned customer information to customer information maintained within the data store 114. Should the data store 114 return a negative comparison, the contact selection service 102 may transmit a message to the customer computing device 104 indicating that the contact request has been denied.

Figure 4B:
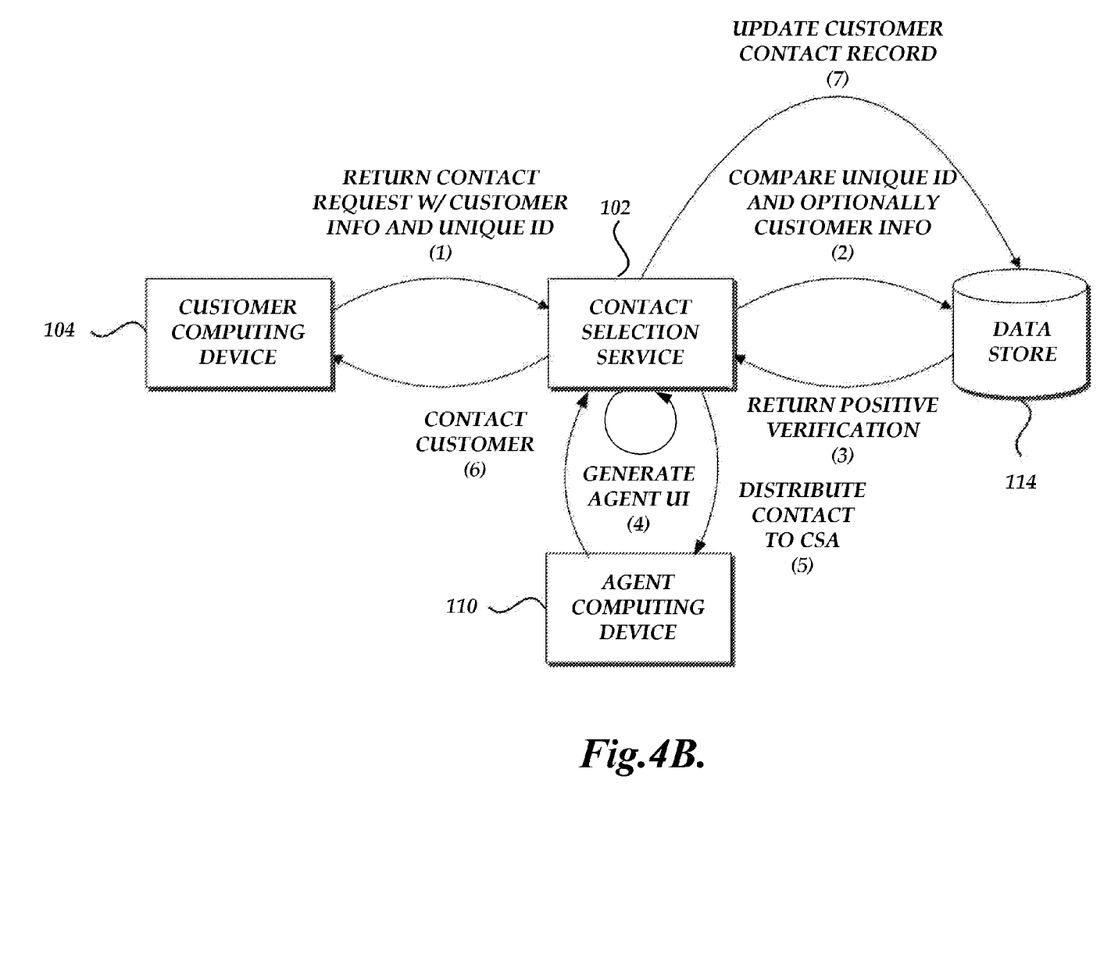
FIG. 4B is a block diagram of the operating environment of FIG. 1, illustrating the contact selection service permitting the customer contact with a customer service agent.

Referring to FIG. 4B, as described above with respect to FIG. 4A, the customer computing device 104 may return the contact request including the unique ID and customer information to the contact selection service 102. In one embodiment, the contact selection service 102 may compare at least the returned unique ID to known unique IDs maintained within the data store 114. In further embodiments, the contact selection service 102 may compare the returned unique ID and one or more of the returned customer information to known unique ID and customer information maintained within the data store 114.

In one embodiment, a positive comparison may be returned by the data store 114 if a match is found to the returned unique ID within the known unique IDs maintained within the data store 114. In another embodiment, a positive comparison may be returned by the data store 114 if a match is found to the returned unique ID within the known unique IDs but greater than a selected number of matches are found to the returned customer information to customer information maintained within the data store 114.

In embodiments where the unique ID includes a self-contained token, comparisons between returned customer information with customer information maintained within the data store 114 may be omitted. Instead, one or more returned customer information may be compared with customer information maintained within the unique ID to make positive or negative comparisons, as discussed above.

Figure 5:
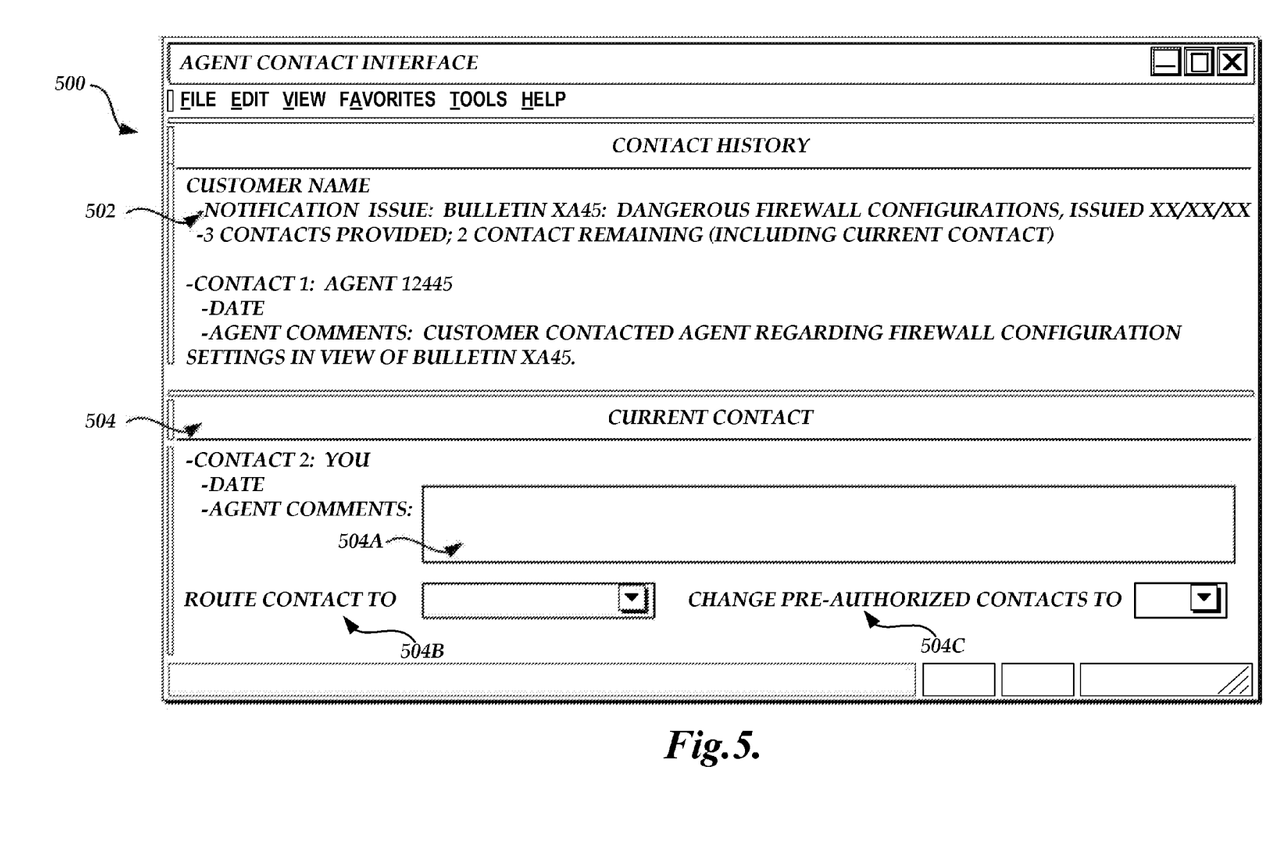
FIG. 5 is an illustrative user interface for display on the agent computing device that facilitates the customer service agent's contact with the customer.

Should a positive comparison be determined, the contact selection service 102 may generate an agent contact user interface and distribute the customer contact to a CSA, whereby contact between the customer and CSA may commence. The agent user interface may be employed by a CSA to facilitate contact with the customer. FIG. 5 is an illustrative agent user interface 500 for display on the agent computing device 110. The agent user interface 500 may include a contact history window 502 and a current contact window 504.

The contact history window 502 may be employed by the CSA to review a contact history of the customer. For example, the contact history may include the name of the customer, the notification gave rise to the generation of pre-authorized contacts for the customer, the allocation of pre-authorized contacts allocated to the customer, and any contacts made with the customer. As illustrated in the example of FIG. 5, a notification was issued regarding dangerous firewall configurations and three pre-authorizations were allocated to the customer. The customer had previously contacted a CSA once to discuss firewall settings.

The current contact window 504 provides tools that may be of use to the CSA during the present contact session. In one embodiment, a field 504A may be provided for the CSA to enter comments resulting from the current contact. In another embodiment, a user interface object 504B may be provided to route a contact to another CSA, in the event that another CSA would be better suited for the customer's needs. In a further embodiment, the user interface object 504C may enable the CSA to change the number of pre-authorized contacts allocated to the customer. As discussed above, based upon the contact, the CSA may determine that the number of pre-authorized contacts should be adjusted and may employ the user interface object 504C to do so.

During or after the contact is completed, the contact selection service 102 may update the pre-authorized contacts that are allocated to the customer. For unique IDs including keys, the contact selection service 102 may update the allocation of pre-authorized contacts within the data store 114. In this manner, when the unique ID is employed to look up the allocation of pre-authorized contacts, the updated, revised allocation of pre-authorized contacts may be retrieved. For unique IDs including tokens, the contact selection service 102 may generate a unique ID token that reflects the revised allocation of pre-authorized contacts. This new unique ID token may be further transmitted to the customer in a new contact user interface and the prior unique ID token may be deactivated so that subsequent contact requests from the customer may reflect the revised allocation of pre-authorized contacts.

All of the processes described herein may be embodied in, and fully automated via software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A non-transitory computer-readable storage medium having computer-executable components, the computer-executable components comprising:
    a communication component, the communication component operative to:
        receive a notification pertaining to a customer; and
        generate a user interface enabling a customer to provide customer information for contact with an agent;
    a pre-contact component, the pre-contact component operative to:
        generate a first unique identifier in response to receipt of the notification by the communication component that is included in the user interface; and
        identify authorization conditions under which the customer is authorized to contact an agent; and
    an authorization component, the authorization component operative to:
        receive a second unique identifier and customer information from the customer; and
        authorize contact between the customer and the agent if the first and second unique identifiers are the same; and
        the authorization conditions under which the customer is authorized to contact an agent are satisfied.

2. The non-transitory computer readable storage medium of claim 1, wherein the authorization conditions comprise at least one of:
    a number of times a customer is authorized to contact an agent; and
    a time duration during which a customer is authorized to contact an agent.

3. The non-transitory computer readable storage medium of claim 1, wherein the authorization component is further operative to authorize contact between the customer and the agent if the first and second unique identifiers are the same and a selected number of the received customer information match customer information known by the authorization component.

4. The non-transitory computer readable storage medium of claim 1, wherein the contact between the customer and the agent comprises one or more of telephone calls, voice-over IP (VoIP) calls, video conferencing, instant messaging (IM), short message service (SMS) text messaging, and electronic mail (e-mail).

5. A system comprising:
    a data store that stores one or more unique identifiers regarding a first person and additional information regarding the first person;
    a computing device in communication with the data store, wherein the computing device is operative to:

receive a contact request from the first person, the contact request including a unique identifier and one or more information regarding the first person that enables a contact to be established between the first person and a second person;

compare at least the received unique identifier with the one or more unique identifiers stored within the data store; and permit contact between the first and second person if the received unique identifier matches the one or more unique identifiers stored within the data store.

6. The system of claim 5, wherein the computing device is further operative to permit contact between the first and second person if the received unique identifier matches the one or more unique identifiers and a selected number of the one or more information regarding the first person stored within the data store.

7. The system of claim 5, wherein the computing device is further operative to:

determine a number of contacts that are authorized between the first and second person from the data store based upon the received unique identifier; and permit contact between the first and second person if the number of contacts that are authorized between the first and second person is greater that zero.

8. The system of claim 5, wherein the computing device is further operative to:

determine a time window during which a contact is authorized between the first and second person, and permit contact between the first and second person if a current time is within the authorized time window.

9. The system of claim 5, wherein the computing device is further operative to generate a user interface that enables the first person to input the one or more information received in the contact request.

10. The system of claim 5, wherein the additional information regarding the first person comprises at least one of customer name, customer address, customer telephone number, customer e-mail address, and an internet protocol address of a computing device of the customer.

11. The system of claim 5, wherein the contact between the first person and the second person comprises one or more of telephone calls, voice-over IP (VoIP) calls, video conferencing, instant messaging (IM), short message service (SMS) text messaging, and electronic mail (e-mail).

12. A system comprising:

a contact component configured to generate a first unique identifier in response to receipt of a notification regarding a first person; and an authorization component operative to:

receive a contact request from the first person, the contact request including a second unique identifier and one or more information regarding the first person that enables a contact to be established between the first person and a second person;

compare the one or more received information regarding the first person with one or more information regarding the first person stored within the first unique identifier; and permit contact between the first and second person if a selected number of the received information and the stored information match.

13. The system of claim 12, wherein the contact component is further operative to:

determine a number of contacts that are authorized between the first and second person from the data store based upon the received unique identifier; and permit contact between the first and second person if the number of contacts that are authorized between the first and second person is greater that zero.

14. The system of claim 12, wherein the computing device is further operative to:

determine a time window during which a contact is authorized between the first and second person; and permit contact between the first and second person if a current time is within the authorized time window.

15. The system of claim 12, wherein the system further comprises a communication component that is operative to generate a user interface that enables the first person to input the one or more information received in the contact request.

16. The system of claim 12, wherein the information regarding the first person comprises at least one of customer name, customer address, customer telephone number, customer e-mail address, and an internet protocol address of a computing device of the customer.

17. The system of claim 12, wherein the contact between the first person and the second person comprises one or more of telephone calls, voice-over IP (VoIP) calls, video conferencing, instant messaging (IM), short message service (SMS) text messaging, and electronic mail (e-mail).

18. A computer-implemented method for selecting contacts between a first person and a second person, the method comprising:

under control of one or more configured computer systems:

allocating authorized contacts between the first person and the second person in response to receipt of a notification pertaining to the first person;

transmitting the notification to the first person with a first unique identifier;

receiving a request for contact with the second person from the first person in response to receipt of the notification, the request including a second unique identifier;

permitting the contact between the first and second person if the second unique identifier matches the first unique identifier and the allocation of authorized contacts is not depleted.

19. The computer-implemented method of claim 18, further comprising receiving information operative to identify the first person within the contact request.

20. The computer-implemented method of claim 19, wherein the identifying information of the first person comprises at least one of a name, an address, a telephone number, an e-mail address, and an internet protocol address of a computing device of the first person.

21. The computer-implemented method of claim 20, further comprising:

comparing the identifying information of the first person received in the contact request to previously maintained identifying information of the first person; and permitting the contact between the first and second person if the first and second unique identifiers are the same and a selected number of the identifying information of the first person received in the contact request match the previously maintained identifying information of the first person.

22. The computer-implemented method of claim 20, further comprising:

comparing the identifying information of the first person received in the contact request to identifying information included within the first unique identifier;

wherein the first and second identifiers are considered to be the same if a selected number of the identifying information of the first person received in the contact request match the identifying information included within the first unique identifier.

23. The method of claim 18, wherein determining the allocation of authorized contacts may comprise one of:
   employing the first unique identifier in a lookup operation to determine the allocated number of authorized contacts associated with the first unique identifier; and
   reading the allocated number of authorized contacts from the first unique identifier.

24. The computer-implemented method of claim 18, wherein the contact between the first person and the second person comprises one or more of telephone calls, voice-over IP (VoIP) calls, video conferencing, instant messaging (IM), short message service (SMS) text messaging, and electronic mail (e-mail).

25. A non-transitory computer-readable storage medium having encoded thereon instructions to selectively permit contact between a first person and a second person, wherein the instructions, when executed by a computing apparatus, cause the computing apparatus to:
   receive a contact request from the first person, the contact request including a unique identifier and one or more information regarding the first person that enables a contact to be established between the first person and a second person;
   compare at least the received unique identifier with the one or more unique identifiers stored within the data store; and
   permit contact between the first and second person if the received unique identifier matches the one or more unique identifiers stored within the data store.

26. The computer-readable medium of claim 25, wherein the computing device is further operative to permit contact between the first and second person if the received unique identifier matches the one or more unique identifiers and a selected number of the one or more information regarding the first person stored within the data store.

27. The computer-readable medium of claim 25, wherein the computing device is further operative to:
   determine a number of contacts that are authorized between the first and second person from the data store based on the received unique identifier; and
   permit contact between the first and second person if the number of contacts that are authorized between the first and second person is greater that zero.

28. The computer-readable medium of claim 25, wherein the computing device is further operative to:
   determine a time window during which a contact is authorized between the first and second person; and
   permit contact between the first and second person if a current time is within the authorized time window.

29. The computer-readable medium of claim 25, wherein the computing device is further operative to generate a user interface that enables the first person to input the one or more information received in the contact request.

30. The computer-readable medium of claim 25, wherein the additional information regarding the first person comprises at least one of customer name, customer address, customer telephone number, customer e-mail address, and an internet protocol address of a computing device of the customer.

31. The computer-readable medium of claim 25, wherein the contact between the first person and the second person comprises one or more of telephone calls, voice-over IP (VoIP) calls, video conferencing, instant messaging (IM), short message service (SMS) text messaging, and electronic mail (e-mail).

* * * * *

UNITED STATES PATENT AND TRADEMARK OFFICE
CERTIFICATE OF CORRECTION

| | | |
|---|---|---|
| PATENT NO. | : 8,340,275 B1 | Page 1 of 1 |
| APPLICATION NO. | : 12/975264 | |
| DATED | : December 25, 2012 | |
| INVENTOR(S) | : Brandwine et al. | |

It is certified that error appears in the above-identified patent and that said Letters Patent is hereby corrected as shown below:

In the Specifications:

In column 13 at line 44, change "300" to --300.--.

In the Claims:

In column 16 at line 37, in Claim 1, change "if" to --if:--.

In column 17 at line 25, in Claim 7, change "that" to --than--.

In column 17 at line 29, in Claim 8, change "person," to --person;--.

In column 18 at line 3, in Claim 13, change "that" to --than--.

In column 20 at line 11, in Claim 27, change "that" to --than--.

Signed and Sealed this
Sixteenth Day of July, 2013

Teresa Stanek Rea
*Acting Director of the United States Patent and Trademark Office*